United States Patent Office 3,250,720
Patented May 10, 1966

3,250,720
STABILIZING AND DEODORIZING
CHLORINATED CYANURATES
William P. Moore, Jr., Chester, Va., assignor to Allied Chemical Corporation, New York, N.Y., a corporation of New York
No Drawing. Filed Nov. 18, 1963, Ser. No. 324,249
12 Claims. (Cl. 252—187)

This invention relates to stabilized chlorinated derivatives of cyanuric acid. More particularly, it relates to new and improved means for avoiding the formation of noxious volatiles during ordinary storage of the compounds trichloroisocyanuric acid (or trichlorocyanuric acid), dichloroisocyanuric acid and alkali metal dichloroisocyanurates, and especially bleaching and disinfecting compositions containing these compounds.

Trichloroisocyanuric acid and potassium dichloroisocyanurate are well known in the art as convenient sources of available chlorine, and are used as constituents of dry bleaches and other cleaning and sterilizing compositions wherein use can be made of the hypochlorite chlorine which is released by these compounds when they are added to water.

It is also known that trichloroisocyanuric acid and potassium dichloroisocyanurate are somewhat unstable, and that under the ordinary conditions of temperature, moisture and light to which household products are subjected they produce noxious odors believed to be caused by volatilization of $NH_2Cl$ and $NCl_3$. Furthermore, when these compounds are mixed with alkali metal sulfates and other inorganic builder salts commonly used in the production of dry bleaching compositions, the tendency for noxious volatiles to be formed is even greater. Several methods have been suggested for overcoming this difficulty. One such method is the inclusion of a finely divided heavy metal salt such as silver nitrate in the composition. This has the disadvantage of using compounds which are relatively costly and, in some instances, toxic. Another suggested method calls for the use of certain olefines containing a tertiary carbon atom attached to another carbon atom by the double bond. The percentage of olefin required for satisfactory stabilization is 5 to 40% by weight of the polychlorocyanuric acid present, an undesirably large amount when dealing with compounds which are flammable and which can only add to the cost of the final product.

In view of the foregoing, it is an object of the present invention to provide an improved method for stabilizing and deodorizing trichloroisocyanuric acid (or trichlorocyanuric acid), dichloroisocyanuric acid and alkali metal dichloroisocyanurates.

It is a further object of this invention to prevent noxious odors which accompany the formation of nitrogen trichloride and monochloroamine by a method which is safe and economical and which does not deleteriously affect the compositions in which trichloroisocyanuric acid and potassium dichloroisocyanurate are commonly used.

Other objects and advantages will be obvious from the following description of the present invention.

It has been discovered that the foregoing objects can be achieved by treating the trichloroisocyanuric acid, dichloroisocyanuric acid or alkali metal dichloroisocyanurate with a small mount of nonionizing solid aromatic compound which contains at least 2 aromatic nuclei and which is a solid at room temperature.

These aromatic compounds may contain groups other than hydrogen and carbon, as in the case of carbazole and para hydroxy biphenyl, or they may be unsubstituted as in the case of naphthalene and anthracene. The aromatitc nuclei may be condensed as in the case of naphthalene or noncondensed as in the case of biphenyl.

Preferably, the stabilizers of this invention have a maximum vapor pressure of 30 mm. mercury at 100° C. Compounds having a vapor pressure of 0.1 to 20 mm. mercury at 100° C. are particularly desirable. Compounds having too high a vapor pressure are lost too quickly, even at room temperature, to prevent the formation of noxious odors for a sufficient length of time. Compounds having too low a vapor pressure, on the other hand, may not sufficiently diffuse through compositions containing large amounts of builder salts to effectively inhibit odor formation.

Among the compounds satisfactory for the purposes of this invention are: naphthalene, anthracene, phenanthrene, parahydroxy biphenyl, carbazole, biphenyl, acenaphthene and 2-methyl naphthalene.

The most significant advantages of these compounds is that they are required in relatively small amounts in order to eliminate the odor problem for extended periods. When used in compositions which contain high percentages of trichloroisocyanuric acid, dichloroisocyanuric acid or potassium dichloroisocyanurate, the odor preventing compounds are most advantageously used in amounts of from 0.2 to 2.0% by weight of the chlorinated compound. However, when used in compositions containing large amounts, for example 90% or more by weight, of inorganic builder salt, the deodorizing additives of this invention are used in amounts as high as 5% by weight of the chlorinated compound. This is believed to be due to (1) the dilution of the deodorizer by the builder salt and (2) the effect of the builder salt in promoting volatilization of the noxious components as referred to previously.

The exact mechanism whereby deodorizing and stabilizing is effected is not completely understood. It is possible that the deodorizing is accomplished by conversion of the noxious compounds generated to solid chlorinated products. It is also possible that some sort of protective layer on the surface of the trichloroisocyanuric acid or potassium dichloroisocyanurate is formed which inhibits formation of noxious volatiles.

The deodorizing compositions may be incorporated with the chlorinated cyanuric acid by various methods, such as compounding the acid with separately formed spray dried beads containing the deodorizing compound and builder salts, or mixing the deodorizing compound with the chlorinated cyanuric acid and builder salts.

Product compositions may range up to about 99% of the trichloroisocyanuric acid or potassium dichloroisocyanurate. Usually household bleaches contain 5 to 15 weight percent of the chlorinated compound, while commercial bleaches contain a higher content. The quantity of deodorizing agent may be varied from 0.01 to 2% based on the weight of the total composition, depending on the amount of chlorinated compound incorporated in the builder salt.

It should be noted that the deodorizers of this invention are also effective in bleaching compositions containing abrasive materials such as silica flour or feldspar.

The following examples illustrate significance of this invention in terms of decreased loss of actve chlorine and elimination of noxious odor.

Example 1

One hundred grams of freshly prepared dry particulate trichloroisocyanuric acid was mixed thoroughly with one gram of finely ground naphthalene and placed in a sealed bottle. After 90 days' storage, no noxious odor had developed.

Example 2

One hundred grams of dry, particulate trichloroisocyanuric acid stored in a closed bottle for 90 days developed a noxious odor. The material was then thoroughly mixed with one gram of finely ground naphthalene. The noxious odor was removed by this treatment.

Example 3

One hundred grams of bleaching compound was prepared by dry mixing granular sodium sulfate and solid, particulate trichloroisocyanuric acid to give a product with the following composition.

| Component: | Wt., g. |
| --- | --- |
| Trichloroisocyanuric acid | 10.0 |
| Sodium sulfate | 90.0 |

The bleaching compound was then dry blended with 0.1 gram of finely ground naphthalene, and stored in a closed bottle for 90 days. No noxious odor developed.

Example 4

One hundred grams of bleaching compound was prepared by mixing ten grams of trichloroisocyanuric acid and 90 grams of sodium sulfate as in Example 3. This bleaching compound was stored for 15 days with the development of a strong noxious odor. The material was then thoroughly mixed with 0.25 gram of naphthalene; the noxious odor was removed.

Example 5

A bleaching compound was prepared by precipitating sodium sulfate from aqueous solution into finely divided trichloroisocyanuric acid. The resultant crystals were dried to give a product containing 9.74 percent active chlorine. One hundred grams of this dried product was thoroughly mixed with 0.1 gram ground naphthalene and stored for 120 days in a sealed bottle. No noxious odor developed.

Example 6

One hundred grams of bleaching compound, prepared as in Example 5, but without added naphthalene, was placed in sealed storage for 120 days. A strong noxious odor developed. When an identical sample was mixed with 0.5 gram anthracene and stored for 120 days, the odor development was less than that developed by the untreated bleach, but the treatment was not as effective as addition of naphthalene.

Example 7

One hundred grams of trichloroisocyanuric acid was mixed thoroughly with 1.0 gram of finely ground naphthalene. This material was then dry-mixed with 1000 grams of sodium sulfate and stored 90 days. No noxious odor developed.

Example 8

Fifty grams of bleaching compound, prepared as in Example 5 but without addition of naphthalene, was sealed in a 4-ounce bottle. After two days, a potassium iodide starch paper was dampened with water and inserted into the space above the solid in the bottle for 15 seconds; the test paper developed a deep purple color indicating the presence of active chlorine in the vapor phase. This active chlorine was considered to be from nitrogen trichloride or monochloramine formed from the trichloroisocyanuric acid. A noxious odor was present. Naphthalene (0.05 gram) was added to the bleach sample and thoroughly mixed. The treated sample was then stored two days and tested as before with the potassium iodide-starch paper. Only a slight discoloration of the paper occurred, indicating the presence of only minute amounts of active chlorine. The noxious odor was absent. This experiment indicates a semiquantitative correlation between the starch iodide test for active chlorine and the intensity of noxious odor from bleaches containing trichloroisocyanuric acid.

Example 9

One hundred grams of bleaching compound was prepared by dry mixing 10 parts trichloroisocyanuric acid (through 20 U.S. mesh) with 90 parts anhydrous sodium sulfate. The resulting mixture was placed in a glass tube, with sealed gas inlet and discharge ports, located in a constant temperature bath at 125° C. Nitrogen gas was metered through the 100-gram sample at a constant rate of 130 cc./minute for 15 days. The loss in active chlorine was 7.6%, as determined by analysis of the composition at the beginning and end of the 15 day period. The sample had a noxious odor. To another one hundred grams of the bleaching compound 0.5 gram of finely ground biphenyl was added. Identical results of analysis of this compound for 15 days showed 5.5% of the original active chlorine was lost and that no noxious odor was present in the sample.

Example 10

One hundred grams of bleaching compound was prepared as in Example 9 except that 0.1 gram finely ground naphthalene was thoroughly mixed into the bleaching compound. This compound was tested in the manner of Example 9 for 15 days. The loss in active chlorine was only 1.0%, and the sample had no noxious odor.

Example 11

Twenty grams of the bleaching compound of Example 10 was placed in a glass absorption tube and held in place with glass wool pads at the inlet and exit ports. Nitrogen gas was passed through the samples at a rate of about 25 cc./minute at a controlled temperature of 40° C. The total nitrogen trichloride and chloramines in the nitrogen discharged from the tube was collected. After twelve days 2.8 mg. of chloramines (as $NCl_3$) was collected. Another twenty gram sample of the bleaching compound of Example 10 was blended with 0.02 gram of finely divided naphthalene and was treated at 40° C. as above. After 12 days the chloramines (as $NCl_3$) collected amounted to only 0.8 mg.

Example 12

Potassium dichloroisocyanuric acid liberates chloramine (nitrogen trichloride) odor on extended storage although considerably less than trichloroisocyanuric acid. Eighty-eight grams of potassium dichloroisocyanurate after 4 months' storage in a closed container developed a noxious odor. Finely ground naphthalene weighing 0.09 gram was thoroughly mixed with the potassium dichloroisocyanurate. The noxious odor was no longer detectable. After one month's storage, the naphthalene was still effective in eliminating the noxious odor.

Example 13

An alkaline builder base was prepared by dry blending the following anhydrous detergent grade fine powders:

Sodium tripolyphosphate (35 wt. percent)
Sodium metasilicate (10 wt. percent)
Sodium sulfate (53 wt. percent)
Sodium alkylnaphthalene sulfonate (2 wt. percent)

Bleaching compositions were made by dry blending 89 grams of this alkaline builder with 0.5 gram of deodorizing additive, and finally with 11 grams of trichloroisocyanuric acid. Samples were allowed to stand in sealed bottles for various lengths of time after which they were tested for odor.

| Deodorizing Additive | Storage Time, weeks | Result |
| --- | --- | --- |
| None (control) | (1) | Noxious odor. |
| Naphthalene | 14 | No noxious odor. |
| p-Hydroxybiphenyl | 14 | Slight unobjectionable odor. |
| Phenanthrene | 12 | No noxious odor. |
| Anthracene | 10 | Do. |
| Carbazole | 10 | Do. |

[1] Less than 1 week.

*Example 14*

This example demonstrates that naphthalene suppresses the loss of available chlorine from trichloroisocyanuric acid bleaching compositions. Samples were stored for 10 weeks. The following tabulations give the percent loss of active chlorine as determined by analysis of the compositions of the start and end of the 10 week period.

| | Control [a], percent | Sample [b], percent |
| --- | --- | --- |
| Open Storage: | | |
| 75° F | 5.6 | 0.9 |
| 125° F | 5.1 | 3.6 |
| Sealed Storage: | | |
| 75° F | 4.5 | 2.8 |
| 125° F | 6.7 | 2.3 |

[a] See Example 13 for control composition.
[b] See Example 13 for sample composition.

I claim:

1. The method of eliminating the noxious odor caused by decomposition of a compound selected from the group consisting of trichloroisocyanuric acid, dichloroisocyanuric acid and potassium dichloroisocyanurate which comprises treating said compound with at least 0.2% by weight of a solid nonionizing aromatic compound which has at least 2 aromatic nuclei and a vapor pressure at 100° C. of 0.1 to 30 mm. Hg, and which is a solid at room temperature.

2. The method of claim 1 wherein the aromatic compound is selected from the group consisting of naphthalene, anthracene, phenanthrene, parahydroxy biphenyl, carbazole, biphenyl, acenaphthene and 2-methyl naphthalene.

3. The method of claim 2 wherein the aromatic compound is naphthalene.

4. The method of eliminating the noxious odor caused by decomposition of a compound selected from the group consisting of trichloroisocyanuric acid, dichloroisocyanuric acid and potassium dichloroisocyanurate which comprises treating a composition consisting essentially of said compound and an inorganic builder salt with 0.01 to 2.0% by weight of said composition of a solid nonionizing aromatic compound which has at least 2 aromatic nuclei and a vapor pressure at 100° C. of 0.1 to 30 mm. Hg, and which is a solid at room temperature.

5. The method of claim 4 wherein the solid aromatic compound is selected from the group consisting of naphthalene, anthracene, phenanthrene, parahydroxy biphenyl, carbazole, biphenyl, acenaphthene and 2-methyl naphthalene.

6. The process of claim 5 wherein the aromatic compound is naphthalene.

7. A composition which is a mixture consisting essentially of a member of the group consisting of trichloroisocyanuric acid, dichloroisocyanuric acid, and potassium dichloroisocyanurate and at least 0.2% of a solid nonionizing aromatic compound which has at least 2 aromatic rings and is a solid at room temperature and has a vapor pressure of 0.1 to 30 mm. mercury at 100° C.

8. The composition of claim 7 wherein the solid aromatic hydrocarbon is selected from the group consisting of naphthalene, anthracene, phenanthrene, parahydroxy biphenyl, carbazole, biphenyl, acenaphthene and 2-methyl naphthalene.

9. The composition of claim 8 wherein the solid aromatic compound is naphthalene.

10. A composition which is a mixture consisting essentially of a member of the group consisting of trichloroisocyanuric acid, dichloroisocyanuric acid, and potassium dichloroisocyanurate, a solid inorganic builder salt and at least 0.01%, based on the combined weight of the previously mentioned constituents, of a solid nonionizing aromatic compound which has at least 2 aromatic nuclei and is a solid at room temperature and has a vapor pressure of 0.1 to 30 mm. mercury at 100° C.

11. The composition of claim 10 wherein the solid aromatic compound is selected from the group consisting of naphthalene, anthracene, phenanthrene, parahydroxy biphenyl, carbazole, biphenyl, acenaphthene and 2-methyl naphthalene, and the inorganic builder salt is sodium sulfate.

12. The composition of claim 11 wherein the aromatic compound is naphthalene.

References Cited by the Examiner

UNITED STATES PATENTS

| 3,003,971 | 10/1961 | Prichard | 252—187 |
| 3,061,549 | 10/1962 | Dickey | 252—187 XR |
| 3,108,078 | 10/1963 | Wixon | 252—187 XR |
| 3,108,079 | 10/1963 | Wixon | 252—99 |
| 3,145,206 | 8/1964 | Fuchs | 252—187 XR |

ALBERT T. MEYERS, *Primary Examiner.*

JULIUS GREENWALD, *Examiner.*

M. WEINBLATT, *Assistant Examiner.*